United States Patent
Lehtinen et al.

(10) Patent No.: US 9,437,039 B2
(45) Date of Patent: Sep. 6, 2016

(54) METHOD AND SYSTEM FOR GRAPHICS RENDERING EMPLOYING GRADIENT DOMAIN METROPOLIS LIGHT TRANSPORT

(71) Applicant: NVIDIA Corporation, Santa Clara, CA (US)

(72) Inventors: Jaakko Lehtinen, Helsinki (FI); Timo Aila, Tuusula (FI); Samuli Laine, Vantaa (FI); Tero Karras, Helsinki (FI); David Luebke, Charlottesville, VA (US)

(73) Assignee: NVIDIA CORPORATION, Santa Clara, CA (US)

( * ) Notice: Subject to any disclaimer, the term of this patent is extended or adjusted under 35 U.S.C. 154(b) by 312 days.

(21) Appl. No.: 13/730,320

(22) Filed: Dec. 28, 2012

(65) Prior Publication Data

US 2014/0071129 A1    Mar. 13, 2014

Related U.S. Application Data

(60) Provisional application No. 61/699,483, filed on Sep. 11, 2012.

(51) Int. Cl.
G06T 15/50         (2011.01)

(52) U.S. Cl.
CPC .............. *G06T 15/50* (2013.01); *G06T 15/506* (2013.01)

(58) Field of Classification Search
None
See application file for complete search history.

(56) References Cited

U.S. PATENT DOCUMENTS

| | | | |
|---|---|---|---|
| 6,483,507 B2 | 11/2002 | Osborne et al. | |
| 6,697,062 B1 | 2/2004 | Cabral et al. | |
| 7,952,583 B2 | 5/2011 | Waechter et al. | |
| 8,207,968 B1 * | 6/2012 | Krishnaswamy et al. | 345/426 |
| 8,248,416 B2 | 8/2012 | Keller et al. | |
| 8,538,204 B1 | 9/2013 | Pantaleoni | |
| 2002/0005850 A1 * | 1/2002 | Osborne et al. | 345/424 |
| 2006/0028469 A1 * | 2/2006 | Engel | 345/426 |
| 2006/0274065 A1 * | 12/2006 | Buyanovskiy | 345/424 |
| 2008/0033277 A1 * | 2/2008 | Yang et al. | 600/407 |
| 2008/0049019 A1 * | 2/2008 | Keller | 345/426 |
| 2010/0085360 A1 * | 4/2010 | Ren et al. | 345/426 |

(Continued)

FOREIGN PATENT DOCUMENTS

| | | |
|---|---|---|
| TW | 201025193 | 7/2010 |
| WO | 2009044282 | 4/2009 |

OTHER PUBLICATIONS

Eric Veach, Leonidas J. Guibas, Metropolis light transport, Proceedings of the 24th annual conference on Computer graphics and interactive techniques, p. 65-76, Aug. 1997.*

(Continued)

*Primary Examiner* — Sultana M Zalalee

(57) ABSTRACT

A method of generating an image. The method includes simulating a presence of at least one light source within a virtualized three dimensional space. Within the virtualized three dimensional space, a light sensing plane is defined. The light sensing plane includes a matrix of a number of pixels to be displayed on a display screen. The method further includes using a light transport procedure, computing a gradient value for each pixel of the matrix to produce a number of gradient values. The gradient computation involves selecting a plurality of light path pairs that contribute to a pixel wherein the selection is biased towards selection of more light paths that pass through pixels having larger gradient values. The plurality of gradient values are converted to a plurality of light intensity values which represent the image.

21 Claims, 10 Drawing Sheets

(56) References Cited

U.S. PATENT DOCUMENTS

| | | |
|---|---|---|
| 2012/0242679 A1 | 9/2012 | Teng et al. |
| 2013/0038618 A1 | 2/2013 | Urbach |
| 2013/0038661 A1 | 2/2013 | Suzuki |
| 2013/0194268 A1 | 8/2013 | Wachter et al. |

OTHER PUBLICATIONS

Pravin Bhat , C. Lawrence Zitnick , Michael Cohen , Brian Curless, GradientShop: A gradient-domain optimization framework for image and video filtering, ACM Transactions on Graphics (TOG), v.29 n.2, p. 1-14, Mar. 2010.*

Toshiya Hachisuka , Wojciech Jarosz , Richard Peter Weistroffer , Kevin Dale , Greg Humphreys , Matthias Zwicker , Henrik Wann Jensen, Multidimensional adaptive sampling and reconstruction for ray tracing, ACM Transactions on Graphics (TOG), v.27 n.3, Aug. 2008.*

Kelemen, C., Szirmay-Kalos, L., Antal, G., and Csonka, F. 2002. A simple and robust mutation strategy for the Metropolis light transport algorithm. Comput. Graph. Forum 21, 3, 531-540.*

Wenzel Jakob , Steve Marschner, Manifold exploration: a Markov Chain Monte Carlo technique for rendering scenes with difficult specular transport, ACM Transactions on Graphics (TOG), v.31 n.4, p. 1-13, Jul. 2012.*

Xu, Q. et al., "A New Refinement Criterion for Adaptive Sampling in Path Tracing", Proceedings of the 2010 IEEE International Symposium on Industrial Electronics (ISIE), 2010, 1556-1561.

Xu, Q. et al., "Noise Reduction for Path Traced Imaging of Participating Media", Proceedings of the 19th European Signal Processing Conference EUSIPCO, Barcelona, Spain, 2011 1683-1687.

Hachisuka, T. et al., Mulitidimentional Adaptive Sampling and Reconstruction for Ray Tracing, ACM Trans Graph., vol. 27, 2008.

Online Encyclopedia, Wikipedia the Free Encyclopedia, definition of "Path Tracing", retrieved May 12, 2012.

* cited by examiner

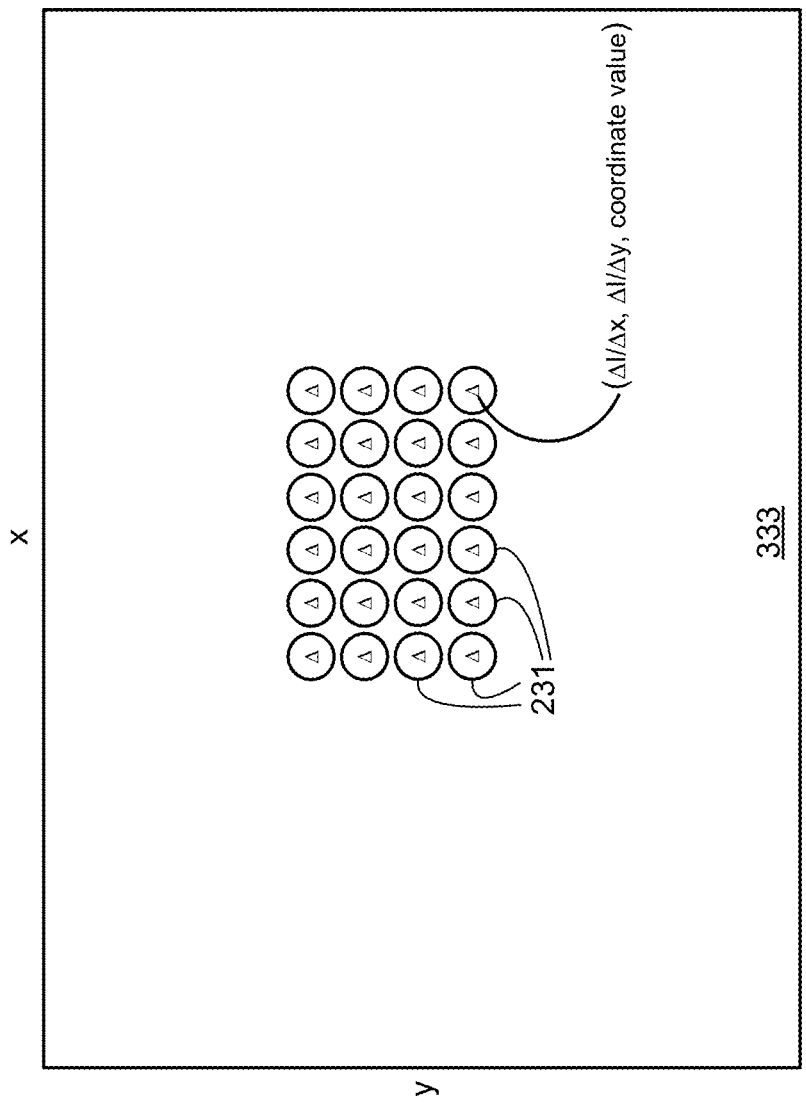

METHOD AND SYSTEM FOR GRAPHICS RENDERING EMPLOYING GRADIENT DOMAIN METROPOLIS LIGHT TRANSPORT

CROSS-REFERENCE TO RELATED APPLICATIONS

This application claims priority from U.S. Provisional Application No. 61/699,483, filed Sep. 11, 2012, the entire disclosure of which is incorporated herein by reference.

BACKGROUND OF THE INVENTION

Metropolis sampling is a standard method for generating realistic images with global indirect illumination effects. Metropolis sampling is unbiased and adaptive. It is unbiased in the sense that generated results can be shown to be correct on average, which is desirable for predictive rendering applications. It is adaptive in the sense that that the procedure aims to spend most computational effort on parts of the light transport simulation that contribute the most absolute radiance to the final image. However, absolute radiance, where standard Metropolis sampling concentrates its effort, is not necessarily a good measure for adaptive sampling.

The standard Metropolis light transport procedure generates a number of samples $(x_\perp i, y_\perp i, P_\perp i)$ where x and y are image coordinates, and P is a path coordinate vector, a high-dimensional vector that identifies a particular chain of ray segments that propagate light from a light source to a particular pixel of a viewing plane. The Metropolis process generates samples such that they are distributed according to the path throughput function f(x, y, P) that measures the differential contribution of a single light path to a single image-space location. The final image is obtained from the samples by marginalizing over P, i.e., computing the density of the samples over the image. However, the current method may be slow in terms of obtaining visual convergence.

BRIEF SUMMARY OF THE INVENTION

Accordingly, a need exists for generating an image with faster visual convergence. Embodiments of the present invention provide for a system and methods for generating an intermediate image that depicts the gradient of an actual image by performing a Metropolis-like light transport process in which light path selection is biased to selection of more light paths for pixels having higher gradient values and then reconstructing the final image by solving a standard Poisson equation to convert from the gradient domain to the primal domain.

More specifically, embodiments of the present invention are directed toward a method of generating an image. The method includes simulating a presence of at least one light source within a virtualized three dimensional space. Within the virtualized three dimensional space, a light sensing plane is defined. The light sensing plane includes a matrix of a number of pixels to be displayed on a display screen. The method further includes using a light transport procedure, computing a gradient value for each pixel of the matrix to produce a number of gradient values. Computing the gradient values includes selecting a number of light path pairs within the virtualized three dimensional space. Computing the gradient values further includes determining for each light path pair, a gradient contribution for a respective pixel of the matrix. Additionally, computing the gradient values includes, for each light path pair, updating a gradient value for the respective pixel with the gradient contribution, wherein the selecting is biased toward selecting more light paths that pass through pixels having larger gradient values. The plurality of gradient values are then converted to a plurality of light intensity values which represent the image.

In another embodiment, the present invention is drawn toward a computer implemented method of generating an image. The method includes simulating a presence of at least one light source within a virtualized three dimensional space. A modified Metropolis light transport procedure is executed to produce a two dimensional pixel matrix of gradient values. The matrix represents a light sensor plane within the virtualized three dimensional space. The Metropolis light transport procedure is modified wherein light path sample selection is biased toward selecting more light paths that pass through pixels of the matrix having larger gradient values assigned thereto. The method further includes converting the gradient values to light intensity values. The light intensity values represent the image.

In yet another embodiment, the present invention is drawn toward a computer system. The computer system includes a processor coupled to a bus, a display screen coupled the bus, and a memory coupled to the bus. The memory includes instructions that when executed on the processor cause the computer system to implement a method of generating an image. The method includes simulating a presence of at least one light source within a virtualized three dimensional space. Within the virtualized three dimensional space, a light sensing plane is defined. The light sensing plane includes a matrix of a number of pixels to be displayed on a display screen. The method further includes using a light transport procedure, computing a gradient value for each pixel of the matrix to produce a number of gradient values. Computing the gradient values includes selecting a number of light path pairs within the virtualized three dimensional space. Computing the gradient values further includes determining for each light path pair, a gradient contribution for a respective pixel of the matrix. Additionally, computing the gradient values includes, for each light path pair, updating a gradient value for the respective pixel with the gradient contribution, wherein the selecting is biased toward selecting more light paths that pass through pixels having larger gradient values. The plurality of gradient values are converted to a plurality of light intensity values which represent the image.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 3A depicts a grid within a viewing plane or screen including a plurality of pixels having gradient values, according to an embodiment of the present invention.

DETAILED DESCRIPTION OF THE INVENTION

Figure 1:
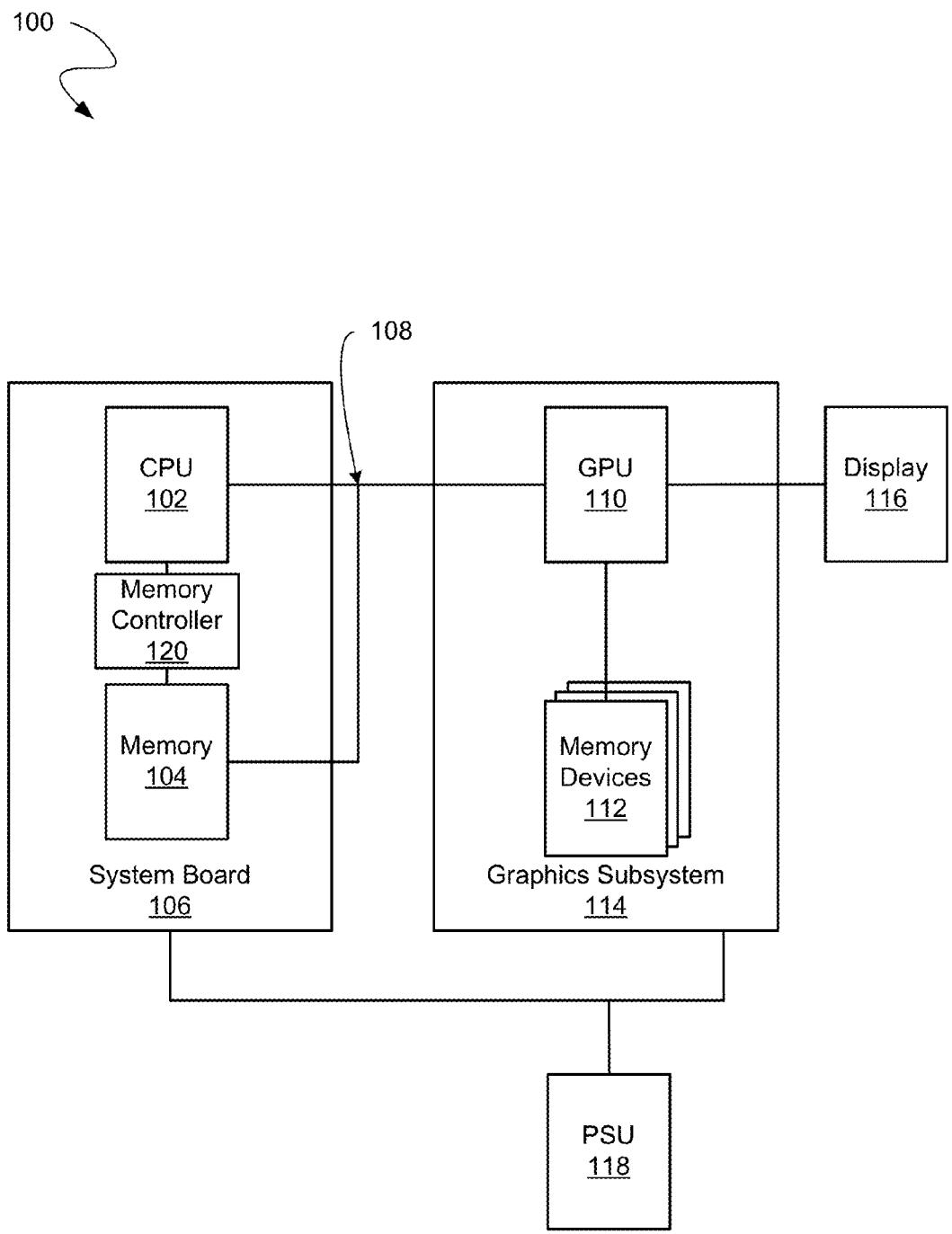
FIG. 1 shows an exemplary computer system, in accordance with one embodiment of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "allocating," "associating," "moving," "copying," "setting," "accessing," "erasing," "freeing," "controlling," "adding," "recording," "determining," "identifying," "caching," "maintaining," "incrementing," "comparing," "removing," "reading," "writing," or the like, refer to actions and processes (e.g., flowchart 400 of FIG. 4) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 shows an exemplary computer system 100 in accordance with one embodiment of the present invention. Computer system 100 depicts the components in accordance with embodiments of the present invention providing the execution platform for certain hardware-based and software-based functionality. In general, computer system 100 comprises a system board 106 including at least one central processing unit (CPU) 102 and a system memory 104. The CPU 102 can be coupled to the system memory 104 via a bridge component/memory controller (not shown) or can be directly coupled to the system memory 104 via a memory controller 120 which in one embodiment can be internal to the CPU 102.

Computer system 100 also comprises a graphics subsystem 114 including at least one graphics processor unit (GPU) 110. For example, the graphics subsystem 114 may be included on a graphics card. The graphics subsystem 114 may be coupled to a display 116. One or more additional GPU(s) 110 can optionally be coupled to computer system 100 to further increase its computational power. The GPU(s) 110 may be coupled to the CPU 102 and the system memory 104 via a communication bus 108. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, memory devices 112 may be coupled with the GPU 110 for high bandwidth graphics data storage, e.g., the frame buffer. In an embodiment, the memory devices 112 may be dynamic random-access memory. A power source unit (PSU) 118 may provide electrical power to the system board 106 and graphics subsystem 114.

The CPU 102 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 102. Additionally, while embodiments herein may make reference to a GPU, it should be noted that the described circuits and/or functionality can also be implemented with other types of processors (e.g., general purpose or other special-purpose coprocessors) or within a CPU.

System 100 can be implemented as, for example, a desktop computer system or server computer system having a powerful general-purpose CPU 102 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 102, 104, 110, 112, and the like) of a computing device are wholly contained within a single integrated circuit die. Examples include a hand-held instrument with a display, a car navigation system, a portable entertainment system, and the like.

Gradient Domain Metropolis Light Transport

Embodiments of the present invention provide for a system and method for using a modified Metropolis light transport process for generating an intermediate image within a viewing plane that depicts the light gradient values of an actual image and then reconstructing the final image by solving a standard Poisson equation to convert from the gradient domain to the primal domain. However, embodiments of the present invention may be applied to any system or method for generating an image. The original Metropolis light transport procedure is described by E. Veach and L. Guibas 1997. Metropolis Light Transport. Proc. SIGGRAPH '97.

Figure 2:
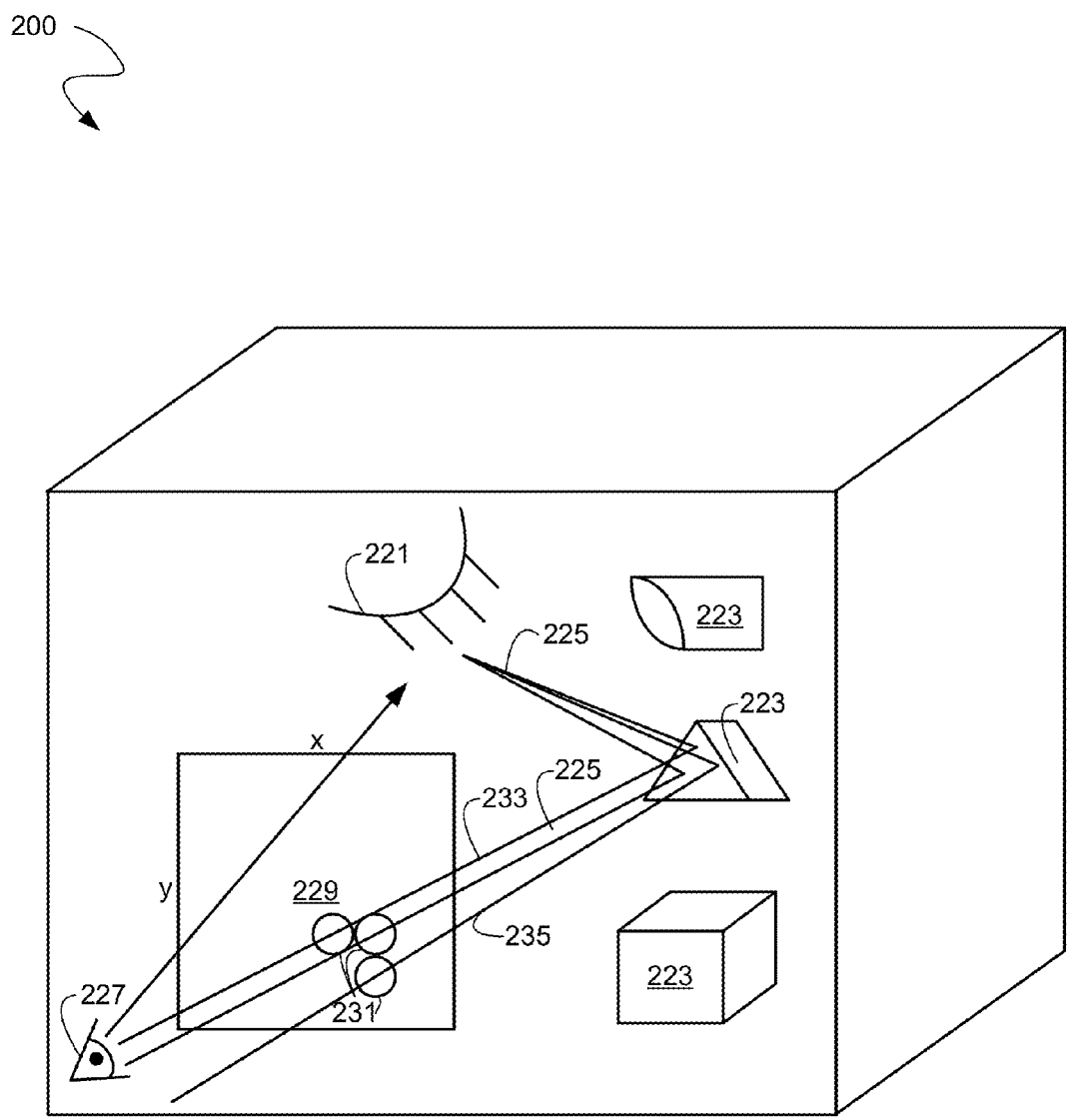
FIG. 2 depicts a virtualized three dimensional graphics scene represented as data objects stored in memory including a light source, according to an embodiment of the present invention.

FIG. 2 depicts a virtualized three dimensional graphics scene 200 represented as data objects stored in memory including a light source 221, according to an embodiment of the present invention. The virtualized three dimensional scene 200 also includes objects 223 within the scene. Light source 221 illuminates virtualized three dimensional scene 200 via illumination path 225. One can appreciate that illumination path 225 is just one of many illumination paths casted by light source 221 in virtualized three dimensional space 200. The virtualized three dimensional scene 200 also includes a viewpoint 227. Viewpoint 227 is the point at which objects 223 are viewed within the three dimensional scene 200. Viewpoint 227 casts a viewpoint through viewing window 229. Viewing window 229 is a two dimensional light sensing plane including a matrix of pixels 231 to be displayed on a display device e.g., display device 116 (FIG. 1).

Illumination path 225 casted by light source 221 reflects and bounces off objects 223. Illumination path 225 is cast according to the standard Metropolis light transport procedure, which is well known in the art. Illumination path 225 passes through a pixel 231 on viewing window 229. In an embodiment of the present invention, illumination path 225 may be perturbed in either the x-direction or the y-direction resulting in a $\Delta x$ light path 233 or a $\Delta y$ light path 235. The $\Delta x$ light path 233 and the $\Delta y$ light path 235 are light paths that are perturbed from illumination path 255 by one pixel in either the x or y direction. Together, illumination path 225 and $\Delta x$ light path 233 form a light sample path pair. Similarly, illumination path 225 and $\Delta y$ light path 235 also form a light sample path pair. These light sample path pairs allow embodiments of the present invention to calculate a light intensity gradient for pixel 231 is a particular direction, e.g., $\Delta x$ or $\Delta y$. The gradient contributions, or the amount of light intensity differential within the pair, is stored for the pixel 231 either in the $\Delta x$ gradient value or the $\Delta y$ gradient value. Each pixel 231 within the matrix of viewing window 229 therefore stores a gradient value for each direction (x-direction and y-direction).

The standard Metropolis light transport procedure generates a path and stores the path's nodes in a list. It can then modify the path by adding extra nodes and creating a new light path. While creating this new path, the procedure decides how many new nodes to add and whether or not these new nodes will actually create a new path. In other words, while path selection may be done partly in accordance with the Metropolis light transport procedure, embodiments of the present invention differ from the Metropolis light transport procedure in that 1) the path sample is perturbed to allow gradient computation and 2) sample light path selection is biased toward selecting more paths that pass through pixels having larger gradient values and vice-versa. In contrast, in the traditional Metropolis light transport algorithm, path selection is biased towards selecting more paths that contribute more lights toward the image.

The present invention aims to discover sample light paths that contribute a larger gradient to the image. In turn, this effects the probability of changing paths to the ones perturbed based on those paths that contribute a larger gradient to the image. Each path contributes a fixed value to the gradient. The path selection is biased based on selection of paths that pass through pixels having a greater gradient. More paths are selected that pass through pixels of large gradients. In this way, sample path selection is biased toward image areas that have greater gradients, e.g., those image areas where the light intensity changes the most. Using a Poisson equation, the gradient values are converted to absolute values (primal domain) of each pixel and the resulting image is displayed on a display device 116 (FIG. 1).

In an embodiment of the present invention, a gradient value between illumination path 225 and Δx light path 233 is calculated. The gradient contribution may be either +1 or −1. The gradient contribution is then deposited to the overall gradient sum (for the x-direction) of illumination path 225 for pixel 231. A similar procedure is carried out for the y-direction. The process is repeated for a subsequent illumination path its corresponding Δx light path and Δy light path. Multiple sample path selection therefore builds up gradient values in the Δx and Δy directions for all pixels in the array.

FIG. 3A depicts a grid within a viewing plane or screen 333 including a plurality of pixels 231 having gradient values, according to an embodiment of the present invention. Each pixel 231 includes two gradient values representing the gradient of the image intensity stored at each pixel 231. Accordingly, what is stored at each pixel is ΔI/Δx and ΔI/y, the overall gradient sum. Additionally, each pixel also includes a coordinate value. The gradient values of the pixel 231 are difference between light path pairs, as described in FIG. 2.

The Metropolis procedure is executed to select paths. The path selection is biased towards those paths that contribution larger gradient values to the pixel. The gradient values are maintained across the screen 333 coordinates of the displayed pixels 231. A Poisson equation is solved on the gradient values to convert the gradient values to absolute values for each pixel 231. The resulting image is then displayed on screen 333 of display device 116 (FIG. 1).

Embodiments of the present invention perform Metropolis light transport based on light path selection biased toward those image areas that have higher gradient values to compute gradient values in the gradient domain for each pixel and convert the gradient values to absolute values in the primal domain prior to displaying the resulting image on a display device.

Figure 3B:
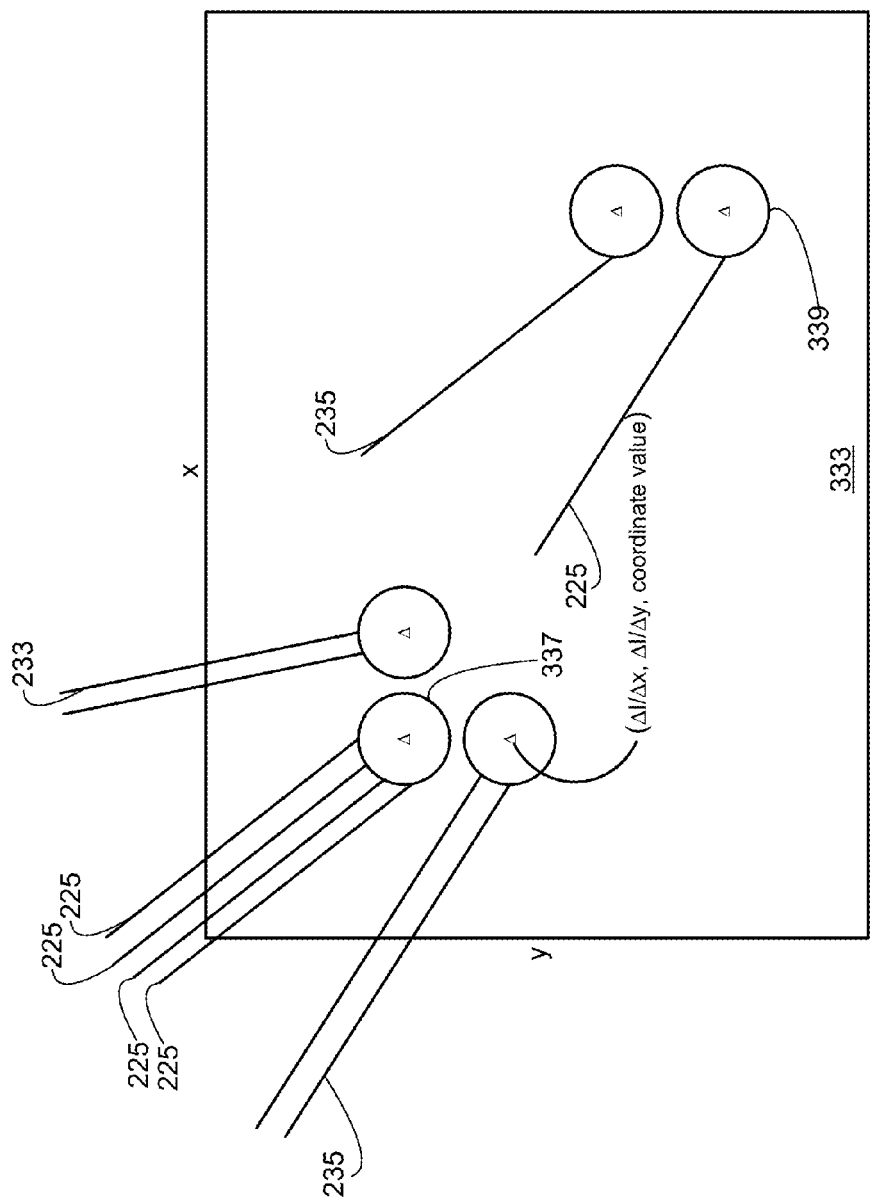
FIG. 3B depicts a grid within a viewing plane or screen including a plurality of pixels having gradient values, wherein certain pixels have greater gradient values than other pixels, according to an embodiment of the present invention.

FIG. 3B depicts an array of pixels within a viewing plane or screen 333 including a plurality of pixels having gradient values, wherein certain pixels have greater gradient values than other pixels, according to an embodiment of the present invention. Screen 333 includes a first pixel 337 and a second pixel 339. In this particular example, first pixel 337 has a larger gradient contribution than second pixel 339. As a result, casting of illumination rays 225 is biased toward first pixel 337 and more samples are taken at first pixel 337. In comparison, less samples are taken at second pixel 339. As mentioned above, both first pixel 337 and second pixel 339 have perturbed light paths, either a Δx light path 233 or a Δy light path 235 for each sample. Together, each illumination ray 225 forms a light path pairs with a Δx light path 233 or a Δy light path 235. Accordingly, first pixel 337 will have more light path pairs than second pixel 339. Each pixel 231 also includes two gradient values representing the gradient of the image intensity stored at each pixel 231. Accordingly, what is stored at each pixel is ΔI/Δx and Ally, the overall gradient sum.

Figure 4:
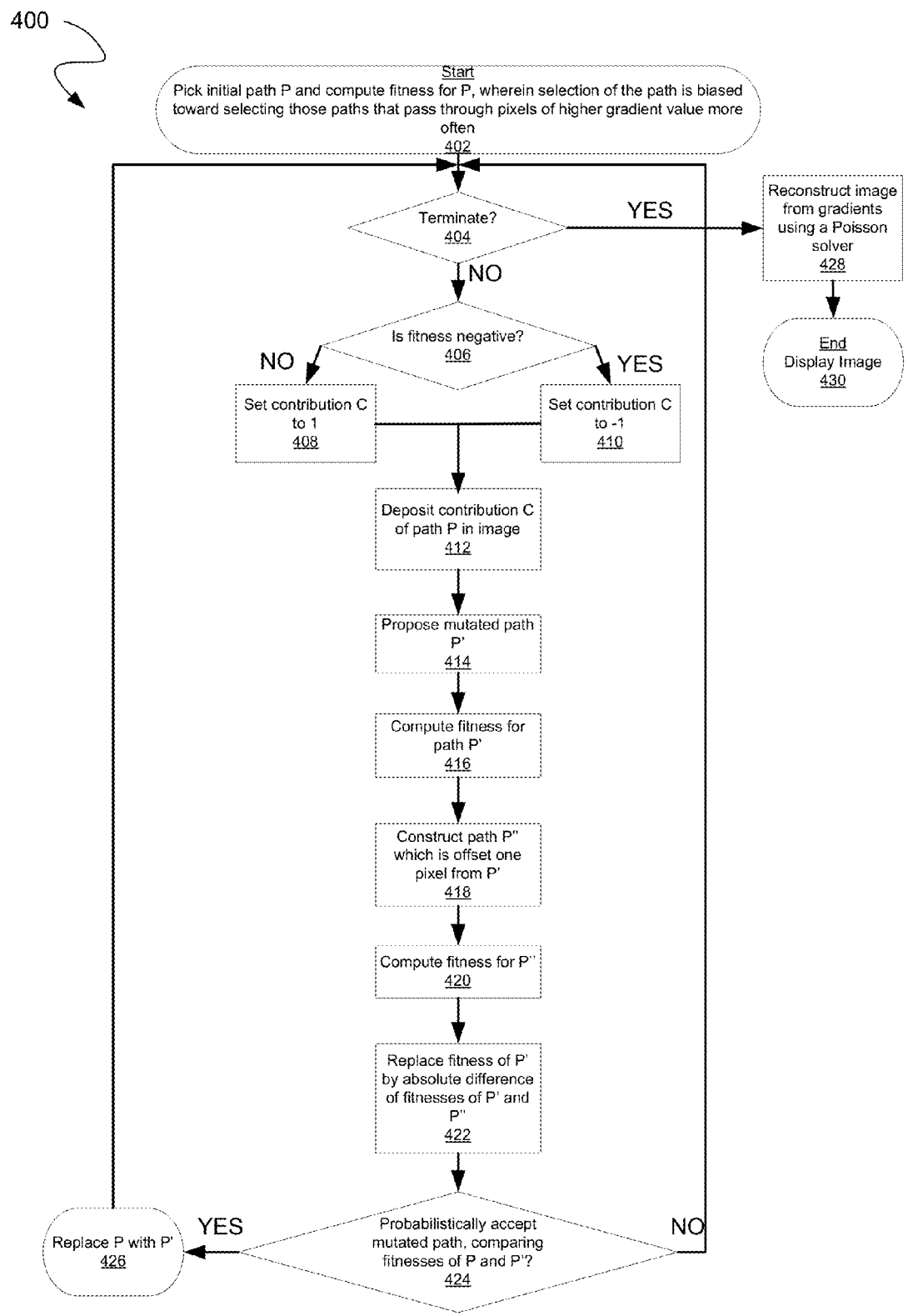
FIG. 4 depicts a flowchart 400 of an exemplary computer controlled process of constructing an image from a gradient based Metropolis light transport procedure, according to an embodiment of the present invention.

FIG. 4 depicts a flowchart 400 of an exemplary computer controlled process of constructing an image from a gradient based Metropolis light transport procedure, according to an embodiment of the present invention. Flowchart 400 depicts the flow of a modified Metropolis light transport procedure. The computations are operated within the gradient domain. The aim of operating in the gradient domain is to concentrate effort on "where things happen" in the image, offering the potential for faster visual convergence.

Generally, a standard Metropolis light transport procedure generates a number of samples $(x_\perp i, y_\perp i, P_\perp i)$ where x and y are image coordinates, and P is a path coordinate vector, a high-dimensional vector that identifies a particular chain of ray segments that propagate light from the light source to a particular pixel. The Metropolis process generates samples such that they are distributed according to the path throughput function f(x, y, P) that measures the differential contribution of a single light path to a single image-space location, i.e., $(x_i, y_i, P_i) \propto f(x, y, P)$. The final image is obtained from the samples by marginalizing over P, e.g., computing the density of the samples over the image.

In embodiments of the present invention, Metropolis sampling is utilized to generate samples that are distributed according to the finite differences of the path throughput function in the x and y directions. Samples are selected that are biased towards selection of those light paths that pass through pixels of higher gradient values. In principle, two sets of samples A and B are generated such that:

$$\tilde{I}(x_i^A, y_i^A, P_i^A) \propto |f(x+1, y, P) - f(x, y, P)|$$

and $$\tilde{I}(x_i^B, y_i^B, P_i^B) \propto |f(x+1, y, P) - f(x, y, P)|$$

e.g., the first set of samples A is distributed according to the absolute per-pixel x differences, and the set B is distributed according to the absolute y differences. In an embodiment, the sample sets are computed using a single sampler, using the direction of the difference as an additional variable in the path throughput function, and switching stochastically between the two according to the standard Metropolis procedure. This process is advantageous in that computing effort is spent on regions of change while still maintaining unbiasedness. It enables estimation of the true signed derivative, as required by the subsequent reconstruction step, instead of its absolute value which drives the sampler.

Once marginalized over P, the two sets of samples A and B form a stochastic estimate of the numerical gradient of the final image. A standard Poisson solver is then employed for generating the image based on the estimated gradients.

More specifically, in block 402, the process of reconstructing and displaying an image from gradients then using a Poisson solver to convert to the primal domain is started. An initial path, P, is chosen and its fitness is computed. A path's fitness is, in many embodiments, the absolute difference of the path contribution. In other embodiments, the path's fitness may be the absolute difference of the path contribution of the primal domain contribution of the path 255. The path selection is biased toward selecting more paths that pass through pixels having larger gradient values and vice-versa. For example, in FIG. 2 an initial path reflecting off the objects is chosen and its fitness is computed.

In block 404, a decision is made whether the process should be terminated due to run time or image completeness. Typically, the process will not be terminated on the first pass of the process. If the process is to be terminated, the image will be reconstructed from the gradients using a Poisson solver, block 428. The process will then end and the final image will be displayed, block 430.

In block 406, if the process is not to be terminated in block 404, a decision is made whether the fitness for P is negative. If the fitness is deemed to be negative, a contribution C is set to negative one, block 410. If the fitness is deemed to be non-negative, a contribution C is set to one, block 408. Typically, pixels having larger gradient values will have more samples selected that pass there through and will have more contribution toward the resulting image. For example, in FIG. 3B, the first pixel has a larger gradient value and thus has more samples selected that pass there through.

In block 412, upon setting contribution C to either one or negative one (in block 408 or block 410), contribution C of path P is deposited within the image. For example, in FIG. 2 a contribution of the path is deposited within the gradient value for the pixel associated with the path.

In block 414, a mutated path P' for is proposed and subsequently a fitness for P' is computed in block 416. In an embodiment, mutated path P' is adjacent to path P. For example, in FIG. 3A, the mutated path is adjacent to original path P, such that it passes through a neighboring pixel, either $\Delta x$ or $\Delta y$.

In block 418, a path P''' is constructed. The path far P''' is offset ($\Delta x$ or $\Delta y$) one pixel from P'. Subsequently, a fitness for P''' is computed in block 420. For example, in FIG. 3A, the mutated path is adjacent to original path P.

In block 422, the fitness of P' is replaced by the absolute difference of the fitness of P' and the fitness of P'''. The absolute difference is computed as part of the procedure.

In block 424, a decision is made whether the mutated path should be probabilistically accepted based on comparing the fitness of P and the fitness of P'. If the mutated path should be accepted, P should be replaced with P', block 426, and the process is repeated with the new P value. If the mutated path should not be accepted, the process is repeated without replacing the P value.

It is appreciated that while flowchart 400 applies to derivatives in the X direction, a similar procedure is run independently for the Y direction. The standard Metropolis light transport procedure comprises blocks 402, 404, 408, 412, 414, 416, 424, 426, and 430. The present invention adds blocks 406, 410, 418, 420, 422, and 428. Blocks 416, 418, 420, and 422 are all a part of the fitness computation. These steps apply to the initial fitness computation in block 402 as well.

By application of this process over the selection of many many paths, step 412 populates the pixels of the display plane with the $\Delta x$ and $\Delta y$ gradient values to thereby construct the image in the gradient domain. At the final step, the Poisson solver may be used, step 428, to convert the gradient domain to the primal domain, e.g., the image intensity values. Knowing the gradients for each pixel and the average image intensity across the image allows conversion to the primal domain, in one embodiment.

In an embodiment, the process of flowchart 400 may be used to directly estimate the numerical Laplacian of the final image instead of its gradient. This involves computing second-order differences along both the x and the y dimensions. A Laplacian representation of the final image is a tighter representation than the gradient field because not every vector field is the gradient of a scalar function.

In a further embodiment, the Poisson solver may be regularized by computing a low-resolution, possibly low-resolution, and noisy primal domain "guidance image" that simultaneously sets the correct scale and offset for the gradient reconstruction and steers the reconstruction towards the correct low-frequency content. This may be accomplished by requiring the local weighted averages of both the reconstructed and guidance images to match.

In yet another embodiment, the procedure may be extended to compute derivatives on multiple scales. For example, double-length gradients $|f(x+2,y,P)-f(x,y,P)|$ and $|f(x,y+2,P)-f(x,y,P)|$ and drive the sampler stochastically at multiple scales to build a gradient pyramid.

Figure 5:
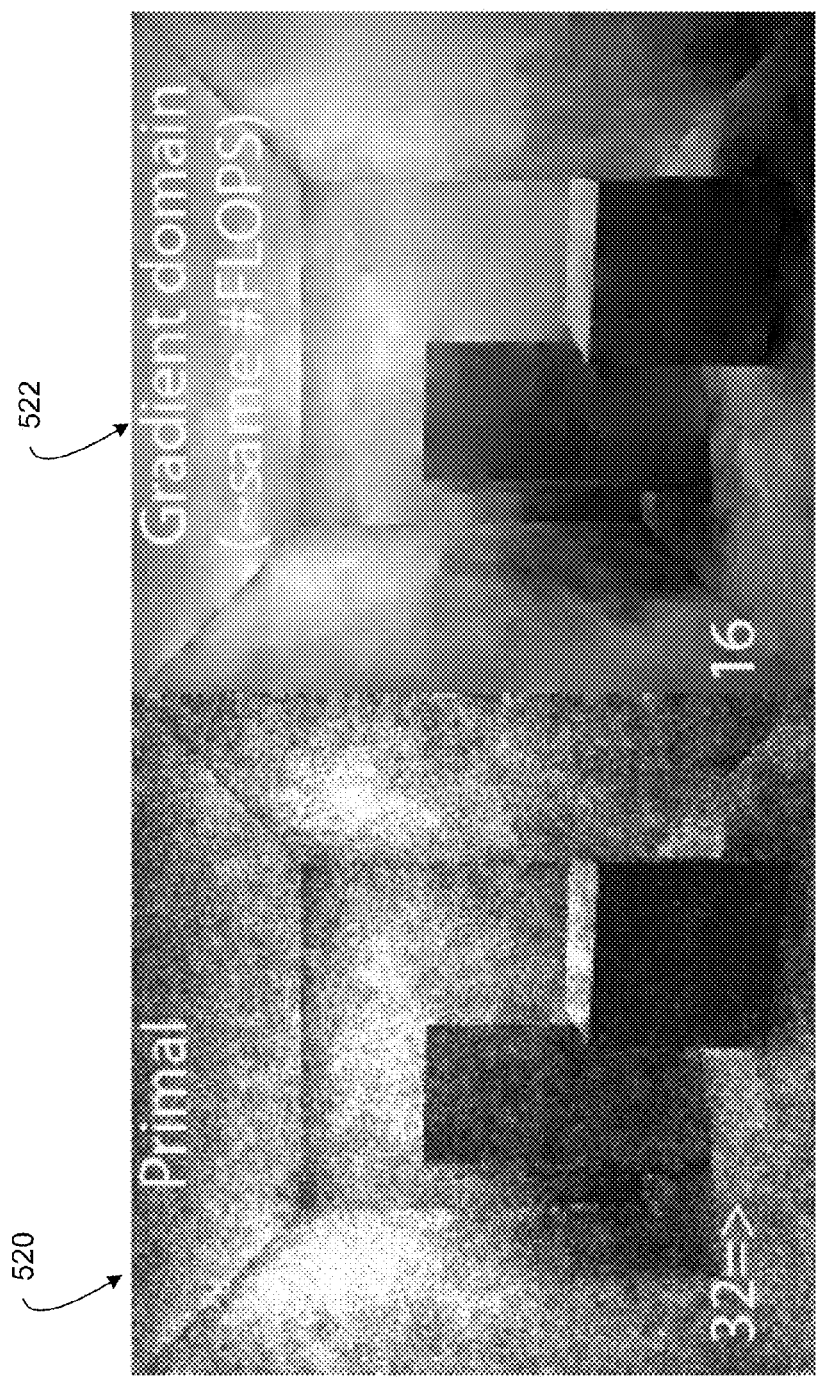
FIG. 5 depicts a comparison of an image generated using a standard Metropolis light transport procedure and a gradient domain Metropolis light transport procedure, according to an embodiment of the present invention.

FIG. 5 depicts a comparison of an image generated using a standard Metropolis light transport procedure 520 and an image generated using gradient domain Metropolis light transport procedure 522, according to an embodiment of the present invention.

The image generated using the gradient domain Metropolis light transport procedure 522 uses a single indirect bounce of illumination in a simple scene. The image generated using a standard Metropolis light transport procedure 520 is calculated in the primal domain. The image generated using the gradient domain Metropolis light transport procedure 522 requires a lower number of samples per pixel than the image generated using a standard Metropolis light transport procedure 520 as modified herein to produce gradient computation and light path selection through pixels of higher gradient values. For example, the approximate number of samples per pixels is 16 for the gradient domain Metropolis light transport procedure 522 and less than or equal to 32 for the image generated using a standard Metropolis light transport procedure 520.

Figure 6:
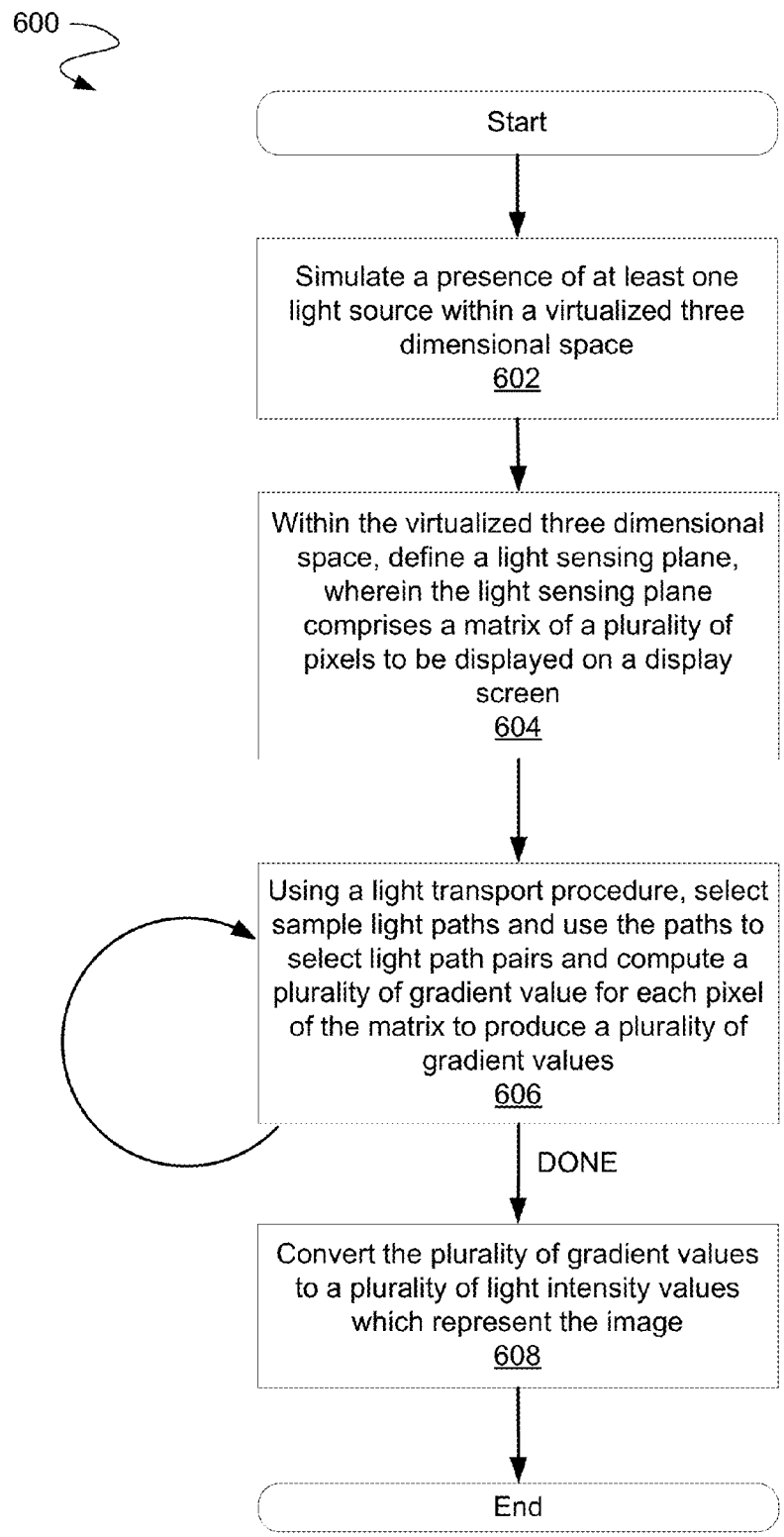
FIG. 6 depicts a flowchart of an exemplary computer implemented process of generating an image, according to an embodiment of the present invention.

FIG. 6 depicts a flowchart 600 of an exemplary computer implemented process of generating an image, according to an embodiment of the present invention.

In block 602, a presence of a least one light source within a virtualized three dimensional space is simulated. For example, in FIG. 5, the gradient domain Metropolis light transport procedure uses a single indirect bounce of illumination in a simple scene.

In block 604, within the virtualized three dimensional space, a light sensing plane is defined. The light sensing plane includes a matrix of a plurality of pixels to be displayed on a display screen.

In block 606, using a light transport procedure, a gradient value is computed for each pixel of the matrix to produce a plurality of gradient values. The computation for each pixel of the matrix is described in the flowchart of FIG. 7. In an embodiment, the light transport procedure is a modified Metropolis light transport procedure. Block 606 is repeated until the process should be terminated due to run time or image completeness.

In block 608, the plurality of gradient values are converted to a plurality of light intensity values which represent the image. The converting includes converting the plurality of gradient values to the plurality of light intensity values using a Poisson solver procedure. In an embodiment, the converting further includes a Metropolis light transport procedure to produce a coarse plurality of light intensity values for the matrix. Further, the converting also includes using the coarse plurality of light intensity values in combination with the plurality of gradient values to produce the plurality of light intensity values.

In an embodiment, the process of generating an image also includes displaying the image on the display screen. The process of flowchart 600 may be implemented using system 100 (FIG. 1).

Figure 7:
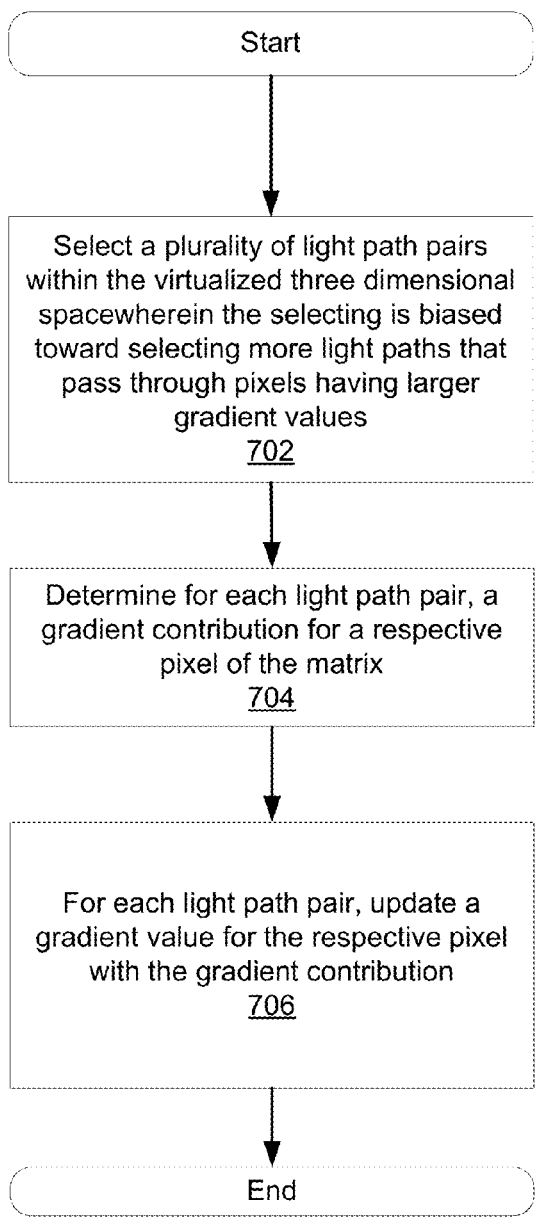
FIG. 7 depicts a flowchart of an exemplary computer implemented process of computing a gradient value, according to an embodiment of the present invention.

FIG. 7 depicts a flowchart 700 of an exemplary computer implemented process of computing a gradient value, according to an embodiment of the present invention. Flowchart 700 describes computing the gradient value in block 606 of FIG. 6.

In block 702, a plurality of light path pairs within the virtualized three dimensional space is selected.

In block 704, for each light path pair, a gradient contribution for a respective pixel of the matrix is determined. In an embodiment, the determining includes, for a first light path of a light path pair, computing a first light intensity contribution to a first pixel of the matrix. Further, the determining includes, for a second light path of the first light path pair, computing a second light intensity contribution to a second pixel, where the second pixel is adjacent to the first pixel. Moreover, the determining includes determining a difference between the first and second light intensity contributions. Additionally, the determining includes assigning the gradient contribution a positive value if the difference is positive and assigning the gradient contribution a negative value if the difference is negative.

In an embodiment, the first and second pixels are positioned in accordance with (x, y) and (x, y+1), respectively, within the matrix. In another embodiment, the first and second pixels are positioned in accordance with (x, y) and (x+1, y).

In block 706, for each light path pair, a gradient value for the respective pixel with the gradient contribution is updated. The selecting in block 502 is biased toward selecting more light paths that pass through pixels having larger gradient values.

Figure 8:
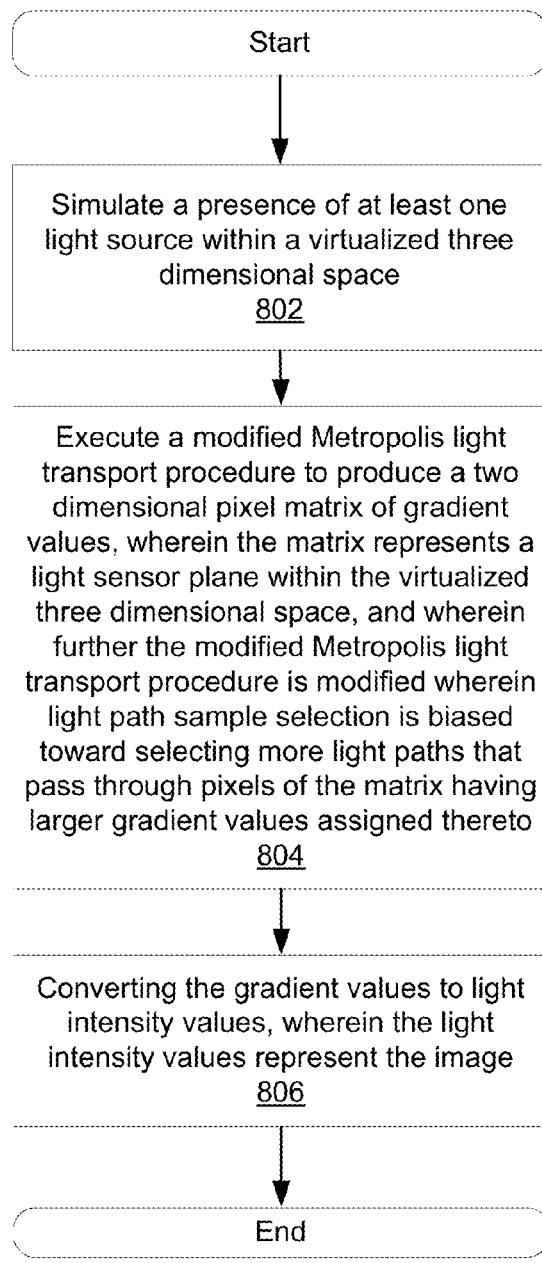
FIG. 8 depicts a flowchart of an exemplary computer implemented process of generating an image, according to an embodiment of the present invention.

FIG. 8 depicts a flowchart 800 of an exemplary computer implemented method of generating an image, according to an embodiment of the present invention.

In block 802, a presence of at least one light source within a virtualized three dimensional space is simulated.

In block 804, a modified Metropolis light transport procedure is executed to produce a two dimensional pixel matrix of gradient values. The matrix represents a light sensor plane within the virtualized three dimensional space. The modified Metropolis light transport procedure is modified wherein light path sample selection is biased toward selecting more light paths that pass through pixels of the matrix having larger gradient values assigned thereto.

Executing the Metropolis light transport procedure includes selecting a plurality of light path pairs within the virtualized three-dimensional space. Further, the procedure includes determining for each light path pair, a gradient contribution for a respective pixel of the matrix. Additionally, the procedure includes, for each light pair, updating a gradient value for the respective pixel with the gradient contribution.

In an embodiment, the determining includes, for a first light path of a light path pair, computing a first light intensity contribution to a first pixel of the matrix. Further, the determining includes, for a second light path of the first light path pair, computing a second light intensity contribution to a second pixel, the second pixel being adjacent to the first pixel. Moreover, the determining includes determining a difference between the first and second light intensity contributions. Additionally, the determining includes assigning the gradient contribution a positive value if the difference is positive and assigning the gradient contribution a negative value if the difference is negative.

In yet another embodiment, the first and second pixels are positioned in accordance with (x, y) and (x, y+1), respectively, within the matrix.

In block 806, the gradient values are converted to light intensity values. The light intensity values represent the image. In an embodiment, the converting includes converting the gradient values to the light intensity values using a Poisson solver procedure.

In an embodiment, the process of flowchart 800 also includes rendering the image by displaying the light intensity values on a display screen.

In yet another embodiment, the process of flowchart 800 also includes performing a standard Metropolis light transport procedure to produce a coarse plurality of light intensity values for the matrix. The converting includes using the coarse plurality of light intensity values in combination with the gradient values to produce the light intensity values.

Figure 9:
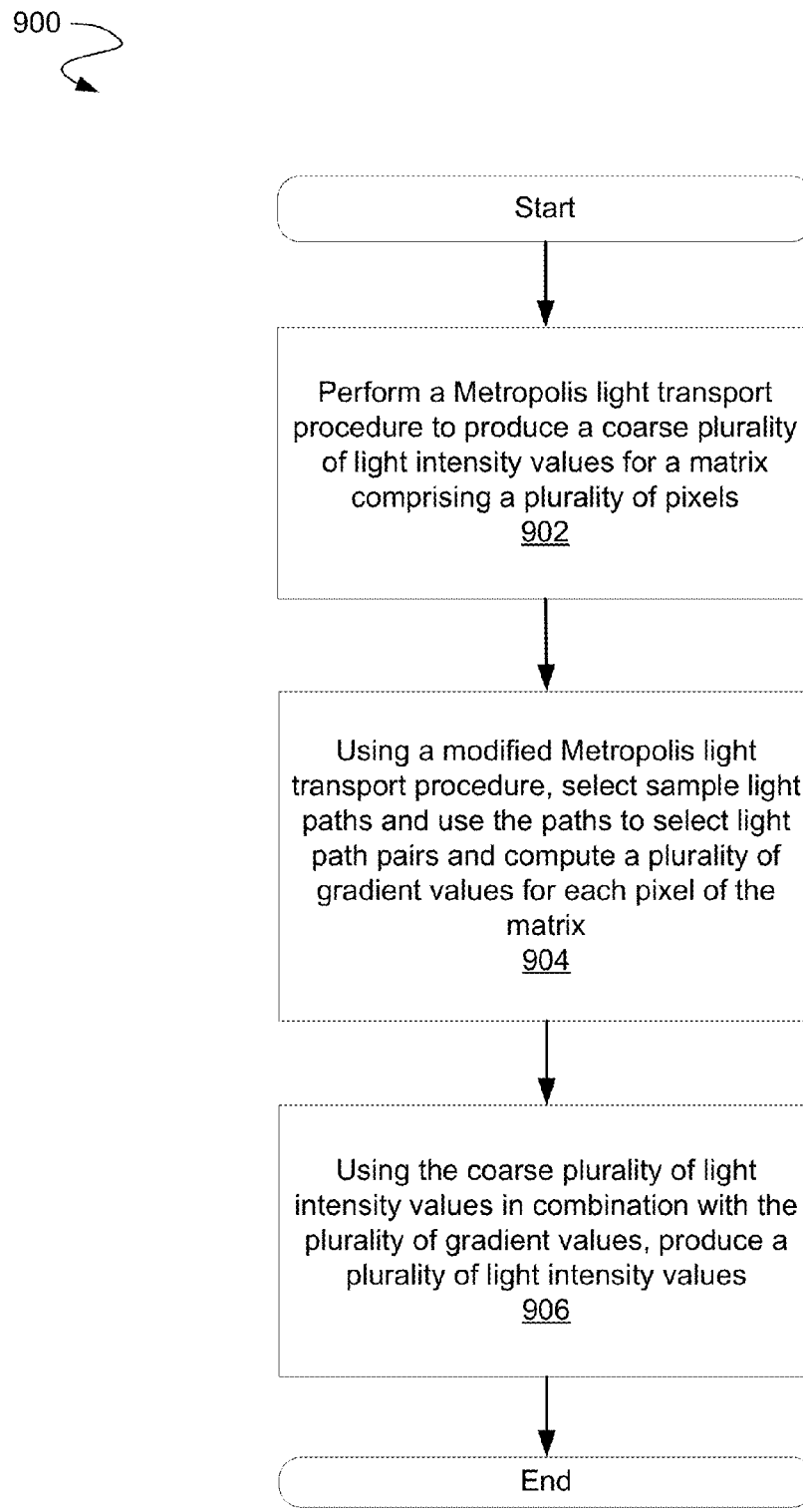
FIG. 9 depicts a flowchart of an exemplary computer implemented process of producing a plurality of light intensity values, in accordance with an embodiment of the present invention.

FIG. 9 depicts a flowchart of an exemplary computer implemented process of producing a plurality of light intensity values, in accordance with an embodiment of the present invention. In block 902, a Metropolis light transport procedure is performed to produce a coarse plurality of light intensity values for a matrix comprising a plurality of pixels. For example, in FIG. 2, a standard Metropolis light transport procedure is performed to produce a plurality of light intensity values for the matrix. The matrix includes a plurality of pixels.

In block 904, a modified Metropolis light transport procedure is used to select sample light paths and use the paths to select light path pairs and compute a plurality of gradient values for each pixel of the matrix. For example, in FIG. 2, a modified Metropolis light transport procedure is used to select sample light paths generated by the light source. The sample light paths are then used to select light path pairs. The light path pairs are a combination of the illumination path and either a $\Delta x$ light path or $\Delta y$ light path. The light path pairs are then used to compute a plurality of gradient values for each pixel within the matrix.

In block 906, using the coarse plurality of light intensity values in combination with the plurality of gradient values, a plurality of light intensity values is produced. For example, in FIG. 4, the coarse plurality of light intensity values combined with the plurality of gradient values are used to produce a plurality of light intensity values prior to displaying the image.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of generating an image, said method comprising:
   simulating a presence of at least one light source within a virtualized three dimensional space;
   within said virtualized three dimensional space, defining a light sensing plane, wherein said light sensing plane comprises a matrix of a plurality of pixels to be displayed on a display screen;
   using a light transport procedure to compute said image, said procedure computing a gradient value for each pixel of said matrix to produce a plurality of gradient values, wherein said computing comprises:
   selecting a plurality of light path pairs within said virtualized three dimensional space;
   determining for each light path pair, a gradient contribution for a respective pixel of said matrix; and
   for each light path pair, updating a gradient value for said respective pixel with said gradient contribution, wherein said selecting is biased toward selecting more light paths that pass through pixels having larger gradient values.

2. A method as described in claim 1 further comprising displaying said image on said display screen and wherein said computing further comprises converting said plurality of gradient values to a plurality of light intensity values which represent said image.

3. A method as described in claim 2 wherein said converting comprises converting said plurality of gradient values to said plurality of light intensity values using a Poisson solver procedure.

4. A method as described in claim 1 wherein said light transport procedure is a modified Metropolis light transport procedure.

5. A method as described in claim 1 wherein said determining comprises:
   for a first light path of a light path pair, computing a first light intensity contribution to a first pixel of said matrix;
   for a second light path of said first light path pair, computing a second light intensity contribution to a second pixel, said second pixel being adjacent to said first pixel;
   determining a difference between said first and second light intensity contributions; and
   assigning said gradient contribution a positive value if said difference is positive and assigning said gradient contribution a negative value if said difference is negative.

6. A method as described in claim 5 wherein said first and second pixels are positioned in accordance with (x, y) and (x, y+1), respectively, within said matrix.

7. A method as described in claim 5 wherein said first and second pixels are positioned in accordance with (x, y) and (x+1, y), respectively, within said matrix.

8. A method as described in claim 3 further comprising performing a Metropolis light transport procedure to produce a coarse plurality of light intensity values for said matrix and wherein said converting comprises using said coarse plurality of light intensity values in combination with said plurality of gradient values to produce said plurality of light intensity values.

9. A computer system comprising:
   a processor coupled to a bus;
   a display screen coupled to said bus; and
   a memory coupled to said bus wherein said memory comprises instructions that when executed on said processor cause said computer system to implement a method of generating an image, said method comprising:
   simulating a presence of at least one light source within a virtualized three dimensional space;
   within said virtualized three dimensional space, defining a light sensing plane, wherein said light sensing plane comprises a matrix of a plurality of pixels to be displayed on a display screen;
   using a light transport procedure to compute said image, said procedure computing a gradient value for each pixel of said matrix to produce a plurality of gradient values, wherein said computing comprises:
   selecting a plurality of light path pairs within said virtualized three dimensional space;
   determining for each light path pair, a gradient contribution for a respective pixel of said matrix; and
   for each light path pair, updating a gradient value for said respective pixel with said gradient contribution, wherein said selecting is biased toward selecting more light paths that pass through pixels having larger gradient values.

10. A computer system as described in claim 9 wherein said method further comprises displaying said image on said display screen and wherein said computing further comprises converting said plurality of gradient values to a plurality of light intensity values which represent said image.

11. A computer system as described in claim 10 wherein said converting comprises converting said plurality of gradient values to said plurality of light intensity values using a Poisson solver procedure and wherein said light transport procedure is a modified Metropolis light transport procedure.

12. A computer system as described in claim 9 wherein said determining comprises:
   for a first light path of a light path pair, computing a first light intensity contribution to a first pixel of said matrix;
   for a second light path of said first light path pair, computing a second light intensity contribution to a second pixel, said second pixel being adjacent to said first pixel;
   determining a difference between said first and second light intensity contributions; and assigning said gradient contribution a positive value if said difference is positive and assigning said gradient contribution a negative value if said difference is negative.

13. A computer system as described in claim 11 wherein said method further comprises performing a Metropolis light transport procedure to produce a coarse plurality of light intensity values for said matrix and wherein said converting comprises using said coarse plurality of light intensity values in combination with said plurality of gradient values to produce said plurality of light intensity values.

14. A computer implemented method of generating an image, said method comprising:
  simulating a presence of at least one light source within a virtualized three dimensional space;
  computing said image by executing a modified Metropolis light transport procedure to produce a two dimensional pixel matrix of gradient values, wherein said matrix represents a light sensor plane within said virtualized three dimensional space, and wherein further said modified Metropolis light transport procedure is modified wherein light path sample selection is biased toward selecting more light paths that pass through pixels of said matrix having larger gradient values assigned thereto.

15. A method as described in claim 14 further comprising converting said gradient values to light intensity values, wherein said light intensity values represent said image and rendering said image by displaying said light intensity values on a display screen.

16. A method as described in claim 15 wherein said converting comprises converting said gradient values to said light intensity values using a Poisson solver procedure.

17. A method as described in claim 14 wherein said executing a modified Metropolis light transport procedure comprises:
  selecting a plurality of light path pairs within said virtualized three dimensional space;
  determining for each light path pair, a gradient contribution for a respective pixel of said matrix; and
  for each light pair, updating a gradient value for said respective pixel with said gradient contribution.

18. A method as described in claim 17 wherein said determining comprises:
  for a first light path of a light path pair, computing a first light intensity contribution to a first pixel of said matrix;
  for a second light path of said first light path pair, computing a second light intensity contribution to a second pixel, said second pixel being adjacent to said first pixel;
  determining a difference between said first and second light intensity contributions; and
  assigning said gradient contribution a positive value if said difference is positive and assigning said gradient contribution a negative value if said difference is negative.

19. A method as described in claim 18 wherein said first and second pixels are positioned in accordance with (x, y) and (x, y+1), respectively, within said matrix.

20. A method as described in claim 18 wherein said first and second pixels are positioned in accordance with (x, y) and (x+1, y), respectively, within said matrix.

21. A method as described in claim 15 further comprising performing a standard Metropolis light transport procedure to produce a coarse plurality of light intensity values for said matrix and wherein said converting comprises using said coarse plurality of light intensity values in combination with said gradient values to produce said light intensity values.

* * * * *